No. 838,457. PATENTED DEC. 11, 1906.
W. H. RIDDLE.
CULTIVATOR TOOTH GANG.
APPLICATION FILED APR. 3, 1905.
2 SHEETS—SHEET 1.
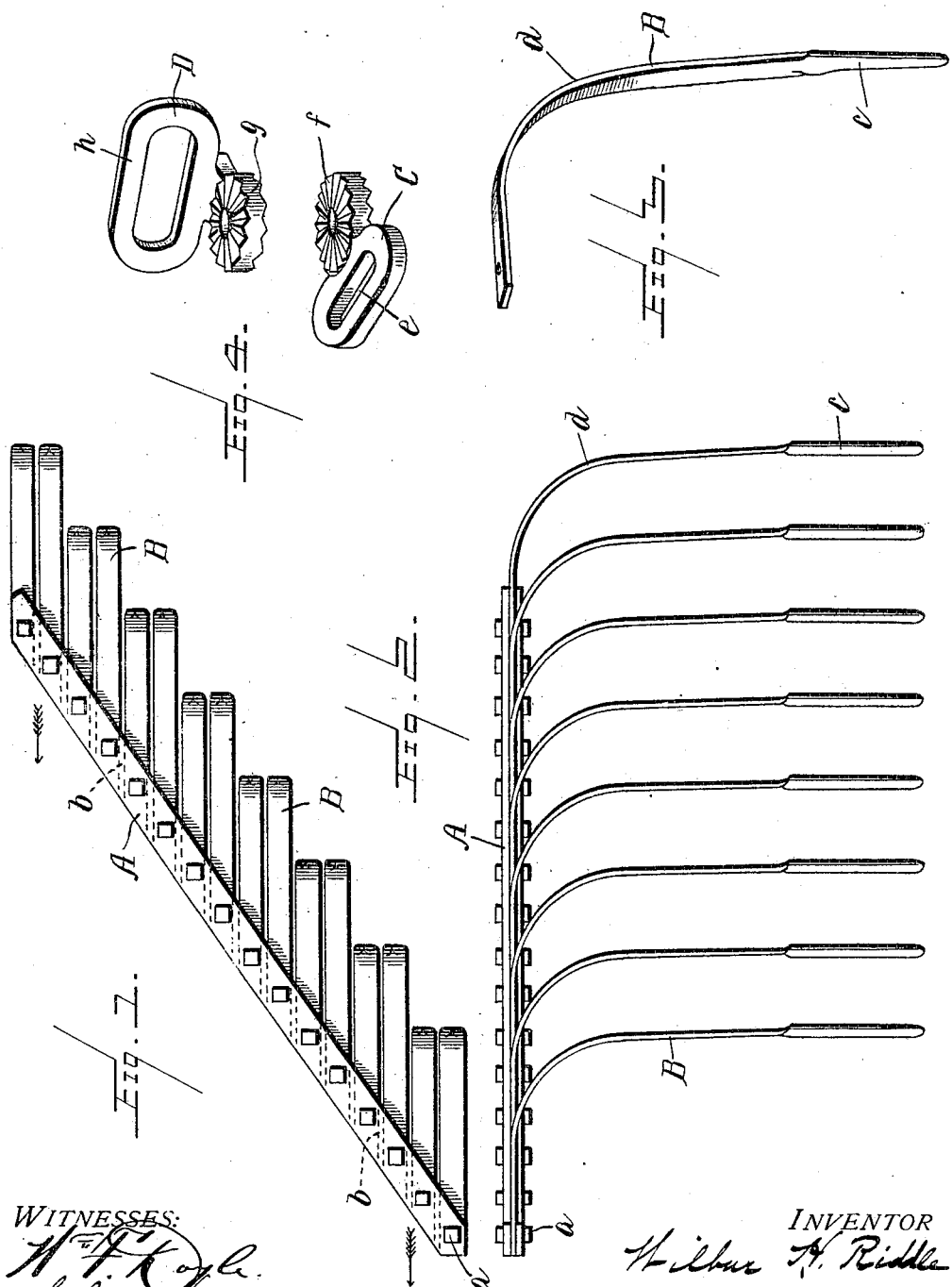

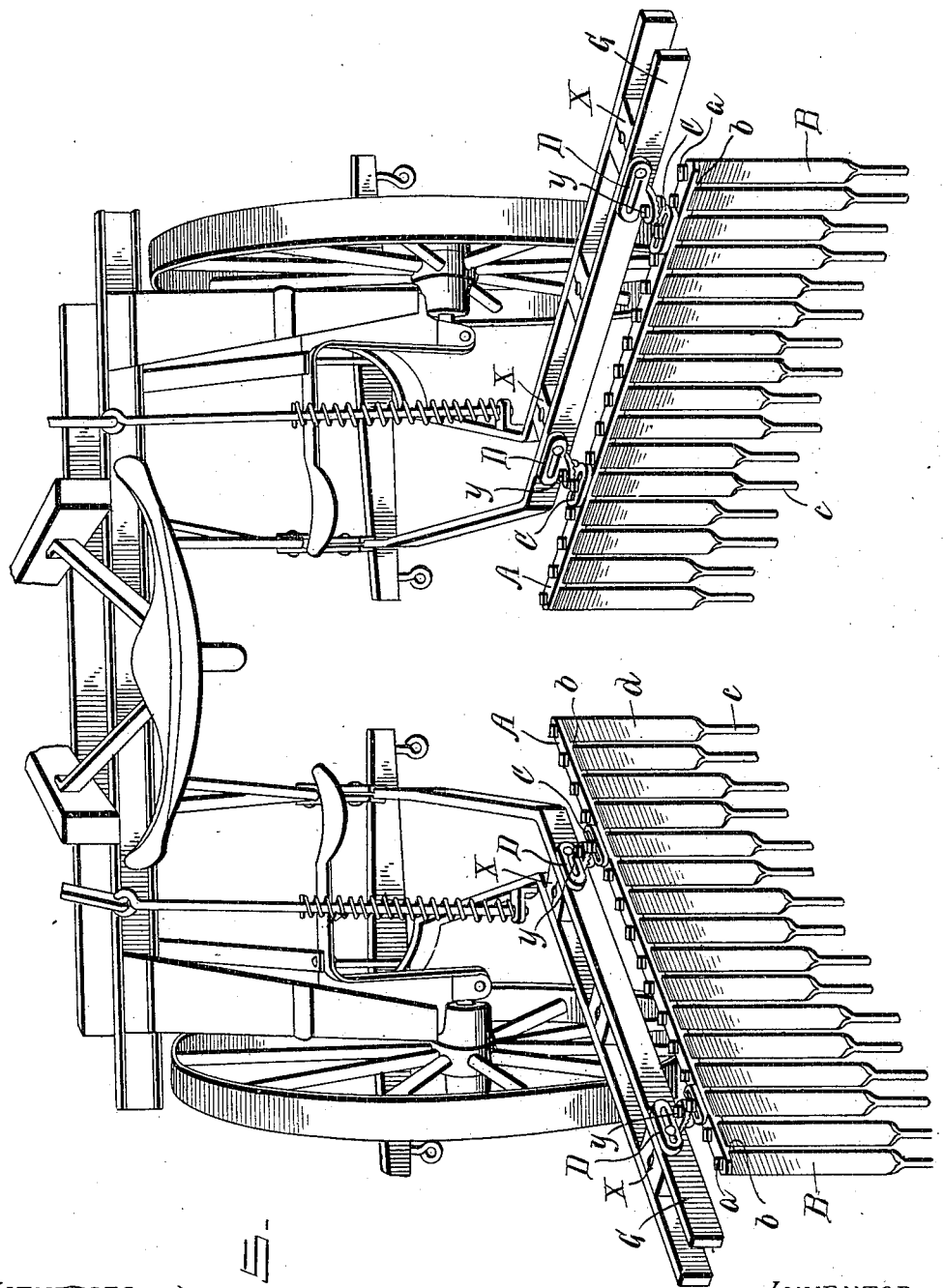

UNITED STATES PATENT OFFICE.

WILBUR H. RIDDLE, OF FORK, MARYLAND.

CULTIVATOR-TOOTH GANG.

No. 838,457.   Specification of Letters Patent.   Patented Dec. 11, 1906.

Application filed April 3, 1905. Serial No. 253,486.

*To all whom it may concern:*

Be it known that I, WILBUR H. RIDDLE, of Fork, in the county of Baltimore and State of Maryland, have invented a new and useful Improvement in Cultivators, of which the following is a specification.

What I have in view is to provide what I term a "cultivator-tooth gang"—that is to say, a bar armed with cultivator-teeth—together with fastening means whereby it may be adjusted and secured to any of the drag-bars of cultivators such as now generally in use as a substitute for the ordinary separately-attached cultivator-blades of the "bull-tongue" or other style with which such implements are usually provided.

The gang, in other words, is a bar armed with cultivator-teeth complete in itself and adapted through the instrumentality of known or suitable fastening devices to be attached to the drag-bars or frame of a cultivator. The tooth which I prefer to employ for this purpose is substantially that of the Hallock Patent, No. 600,782, of March 15, 1898—that is to say, a flexible tooth having a substantially straight lower end portion small in size and substantially round or equivalently formed in cross-section adapted to engage the soil and a flat spring-yielding bowed upper portion adapted to be secured to the support by which it is carried. A tooth of this kind is well adapted for the purpose I have in view, and when a number of them are assembled and held upon a supporting-bar, as hereinafter described, they will when the bar is secured to the frame of a cultivator perform all that is done by the cultivator-blades ordinarily employed much better than the latter and will "cultivate" the ground more thoroughly and efficiently than would otherwise be possible, the teeth themselves by reason of their flat bowed upper portions being prevented from lateral deflection, while by their general elasticity and flexibility vertically and in fore and aft direction their attenuated lower ends act most efficiently upon the soil and cultivate it thoroughly without at the same time being harsh or destructive in their action.

In the accompanying drawings, to which reference will now be made for a better understanding of my invention, Figure 1 is a plan and Fig. 2 is a side elevation of a cultivator-tooth gang embodying my invention. Fig. 3 is a view of one of the teeth. Fig. 4 is a view of one form of a two-part clamp which may be used to secure the gang to the drag-bars of an ordinary cultivator. Fig. 5 is a rear view of a straddle-row riding-cultivator of one well-known type having one of my cultivator-tooth gangs applied to each of its drag-bars in lieu of the separately-attached bull-tongue cultivator-blades usually employed.

The gang consists of the bar A, usually of malleable iron, and the teeth B, secured thereto by suitable means, as by bolts $a$, which pass through the bar and the several ends of the flat upper portions of the teeth, which are on the under face of the bar. The bar A preferably is cast or otherwise formed on its under side with ribs $b$, between which the ends of the teeth are inserted, and are thus held from twisting or turning on their retaining-bolts $a$. The teeth in this case are placed so as to extend fore and aft in a vertical plane parallel with the line of draft, which latter is indicated by the arrow in Fig. 1, and in the present instance they have a stepped arrangement in pairs, as seen more particularly in Fig. 1, although this is not indispensable.

The drag-bars of cultivators usually stand at an angle to the line of travel, the two drag-bars converging to the front in roughly-truncated V form, and the tooth-bar A when applied to its drag-bar on the cultivator will stand at a similar angle; hence the arrangement of the teeth B in vertical planes oblique to their bar as represented.

Each tooth B as indicated more clearly in Fig. 3, has substantially a straight lower end portion $c$ of attenuated cross-section and a flat bowed spring-yielding upper portion $d$, in this respect resembling the tooth of the Hallock patent, No. 600,782, above referred to.

A form of clamp by which the gang may be secured to a cultivator drag-bar is shown in Fig. 4. It consists of a cross-piece C, to be attached to the bar A of the gang, and a bracket D, to be attached to the drag-bar of the cultivator. The cross-piece C has a slotted portion $e$ to receive one of the bolts on the bar A and a circular centrally-perforated offset $f$, which is radially ribbed on both sides. The bracket has a similar circular centrally-perforated radially-ribbed offset $g$ and an upturned longitudinally-slotted portion $h$ to be bolted to the side of the cultivator drag-bar. The two ribbed circular portions $f$ $g$ of this fastener are to be bolted together through the central hole in them, the ribs when the one is adjusted circularly with reference to the other serving to hold them in that adjusted position when the central bolt is tightened. Each part of this fastener is reversible, and it can be readily applied to secure tooth-gang bars to any style of drag-bar found in cultivators now in use.

In Fig. 5 a tooth-gang bar is shown applied to each one of the drag-bars G of a straddle-row riding-cultivator, the ordinary cultivator blades or teeth having first been removed from the points X, where they usually are located. Only two fasteners are shown for each bar A; but three or more can be used, if desired. In each fastener the part C is bolted to the gang-bar A, and the crosspiece D is bolted to the drag-bar, using for this purpose the bolt or one of the bolts $y$, which are usually employed to clamp the ordinary cultivator-blades in their boxes or bearings between the two limbs of the drag-bar.

In conclusion I would say with respect to the practical advantages growing out of the use of my invention that besides thoroughly cultivating the ground the small closely-set and preferably spring-acting ends of the teeth serve as mulchers to pulverize the ground and to form on top of the soil a fine dirt mulch which acts in some sort as a cover or blanket to retain the moisture in the earth below and to retard materially its evaporation, a result which cannot be attained by the use of the ordinary bull-tongue cultivator-blades. I prefer, as before said, to use small teeth of the general shape of those employed on the weeder of the Hallock patent, No. 600,782; but I do not wish to be understood as limiting myself thereto. What is essential is that the ends of the teeth which enter and act on the ground should be attenuated in cross-section and that the teeth themselves should be of such small dimensions as to permit them to be set reasonably close together in order that their attenuated lower ends may cover thoroughly the ground to be worked.

Having described my invention, what I claim herein, and desire to secure by Letters Patent, is—

A cultivator-tooth gang comprising a series of closely-assembled teeth having attenuated lower ends as described, and a supporting-bar to which said teeth are secured, in combination with a cultivator drag-bar, and reversible fasteners for connecting the drag-bar and tooth-bar consisting of longitudinally-slotted portions $e$, $h$, and provided with ribbed circular portions $f$, $g$, respectively, and bolts for holding said circular portions $f$, $g$, together in adjusted position, substantially as and for the purposes hereinbefore set forth.

In testimony whereof I affix my signature in presence of two witnesses.

WILBUR H. RIDDLE.

Witnesses:
W. LEE HELMS,
GEO. W. REA.